United States Patent [19]
Harrison

[11] 3,773,180
[45] Nov. 20, 1973

[54] OIL FILTER HOUSING ASSEMBLY

[76] Inventor: Dan K. Harrison, 15140 Vase St., Van Nuys, Calif.

[22] Filed: Apr. 10, 1972

[21] Appl. No.: 242,500

[52] U.S. Cl............ 210/315, 210/443, 210/DIG. 17
[51] Int. Cl........................ B01d 27/08, B01d 29/24
[58] Field of Search.................... 210/315, 316, 317, 210/437, 440, 450, 453, 455, DIG. 14, DIG. 17, 443

[56] References Cited
UNITED STATES PATENTS

| 2,873,029 | 2/1959  | Humbert, Jr........................ 210/440   |
| 3,481,478 | 12/1969 | Williams .......................... 210/440 X |
| 3,344,925 | 10/1967 | Graham ........................... 210/437 X |
| 1,289,512 | 12/1918 | Minard ............................ 210/315 X |
| 2,928,547 | 3/1960  | Lawrence ........................ 210/437 X |
| 2,658,622 | 11/1953 | Thornhill ......................... 210/437 X |

Primary Examiner—Samih N. Zaharna
Assistant Examiner—T. A. Granger
Attorney—Charles G. Lyon et al.

[57] ABSTRACT

A filter housing assembly for the filtering of oil in automobile engines and the like which can be connected directly to the engine block of most models of engines without special adapters or additional plumbing by virtue of the provision of a non-concentric mounting configuration for the mounting plate. The exterior housing receives an inner liner consisting of an ordinary No. 2 ½ tin can, which in turn contains any type of low cost filtering media, such as toilet tissue. The inner liner is supported at the bottom so that its bottom wall is spaced away from the bottom of the outer container, permitting flexing of the inner container if pressure changes occur, and the inner liner traps the sludge so that the filter can be changed without having to clean the outer container. Parallel flow is achieved in the filter media for greater efficiency.

10 Claims, 2 Drawing Figures

PATENTED NOV 20 1973

3,773,180

OIL FILTER HOUSING ASSEMBLY

BACKGROUND OF THE INVENTION

Many types and configurations of oil filters are well known in the art and it is also well known in the art that toilet tissue or other similar types of media may be used in oil filters and that such media are among the most efficient filtering medias known. The present invention is not directed to the use of toilet tissue per se but to an improved type of filter assembly which can accommodate media of that type. Other known oil filter assemblies capable of utilizing such filtering media are rather complex in their design and costly to install inasmuch as they provide no means for attachment directly to the engine block in a simple manner but usually require the placement of the filter housing at a remote location coupled to the engine block by means of extra plumbing conduits. The utilization of such devices is unnecessarily expensive to the consumer. Additionally, such devices must be cleaned when the filter media is changed to remove the collection of sludge at the bottom of the container. This not only requires the use of solvents to remove the sludge, but is also a messy task and is unnecessarily time consuming. Further, the prior devices usually provide for transverse flow of the oil through the filtering media which is not the most efficient utilization of the media. Finally, prior devices are ordinarily limited to flow through the filtering media in one direction, because of the manner in which they are constructed.

SUMMARY OF THE INVENTION

I have solved the foregoing problems by designing a filter assembly which can be connected directly to an engine block at the same location orginally contemplated by the manufacturer without need for special adapters, tools, or plumbing conduits. This is accomplished by providing a cylindrical container in which the inlet and outlet apertures are slightly off-center with respect to the center axis of the container, yet which will accommodate a substantially cylindrical filtering media such as a roll of toilet tissue or the like. An inner container or liner for the filter media eliminates the need to clean the filter housing when the filter media is changed. Here, the filtering media and the inner liner can be merely extracted from the housing and thrown away as both are very low-cost elements. The design of the housing accommodates flow through the filter in either direction so that use of this filter housing is not at all dependent upon the manner in which the engine oil pump circulates oil through the filter. Another advantage of my filter housing is that it directs flow through the filtering media parallel to the orientation of the fibers therein which is a more efficient path of flow for the fluid. Finally, the present filter housing can accommodate ordinary household toilet tissue, and the inner liner consists of a No. 2 ½ tin can both of which are very inexpensive so that the cost of changing the oil filter is substantially reduced as compared to conventional filtering elements presently on the market. In place of toilet tissue, cellulose material, plastic or rubber foam and other types of materials may be used. Hereinafter, reference to toilet tissue is for convenience of explanation only and not a limitation.

It is an object, therefore, of the present invention to provide an improved oil filter assembly which can be substituted for filter assemblies presently in use on most models of engines without adapters or without alteration of the oil filtering system.

It is also an object of the present invention to provide an improved oil filter assembly which can accommodate a very low cost filtering media and a low-cost container therefor.

It is also an object of the present invention to provide an improved oil filter assembly which is not only low in initial cost and in its replacement but it is also easier and cleaner to maintain.

These and other objects and advantages of the present invention will be more readily apparent upon reading the ensuing detailed description in conjunction with the accompanying drawings.

DESCRIPTION OF THE PREFERRED EMBODIMENT

Figure 2:
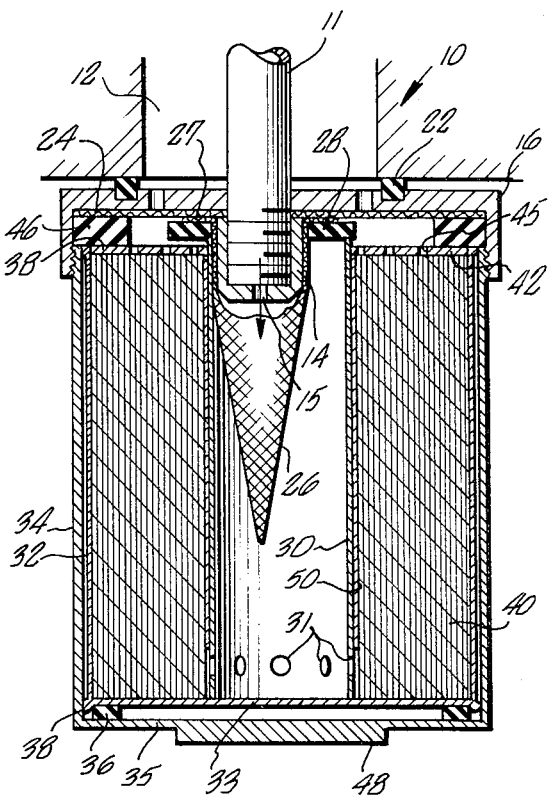
FIG. 2 is a sectional view of the assembled filter attached to an engine block with filter media contained therein.

A portion of an engine block is designated by the numeral 10 in FIG. 2 having an oil line 11 which communicates oil from the engine to the filter under pressure. An annular passage 12 is also shown surrounding oil line 11 and it is through this passage that oil returns to the oil sump after exiting through line 11. It is equally contemplated that in some engines the direction of flow through line 11 and passage 12 may be reversed but the present invention works equally well in either case. With this provision in mind I shall hereinafter, for convenience refer to line 11 as the inlet and passage 12 as the outlet.

To the end of oil line 11 is threadedly connected a nipple 14 having a small aperture 15. Surrounding oil line 11 and positioned between nipple 14 and the engine block 10 is a cover plate 16. Cover plate 16 has an inlet aperture 17 which receives line 11 therethrough, and a plurality of outlet apertures 18 disposed in a concentrically circular pattern about aperture 17, which communicate with the oil passage 12 of the engine block. An annular groove 20 is provided in the top of the cover plate 16 and receives therein a sealing ring 22. It will be noted that the aperture 17 in the top cover plate which accommodates oil line 11 and the radially disposed apertures 18 which are concentric with the axis of aperture 17 are all slightly off set from the center axis of the cover plate 16. This is necessary in order that the container may fit properly to the engine block and the off-center mounting permits the cover plate, when it is attached to the engine block, to be oriented so that the entire filter assembly will not interfere with any surrounding structure of the engine or the engine compartment yet still provide a fluid conductive passage which communicates directly with the central opening of the filter media. Between the nipple 14 and the cover plate 16 is situated a wire mesh screen 24, the purpose of which is to trap large particles which may be entrained in the oil should the oil be entering the filter housing through passage 12. If oil enters the filter housing through line 11, the function of screen 24 is to prevent the passage into the engine block of any pieces of filter material which may break loose.

Figure 1:
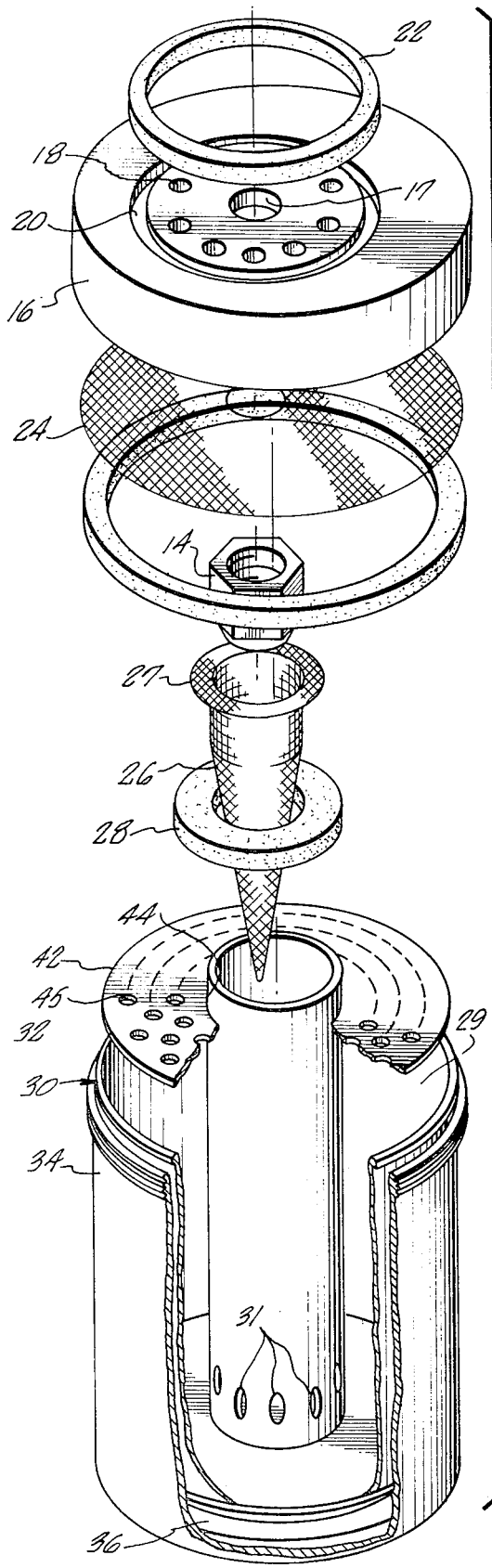
FIG. 1 is an exploded perspective view, partially in section showing the elements of the filter assembly.

A conically shaped wire mesh screen 26, the configuration of which can best be seen in FIG. 1, surrounds the nipple 14 and is provided at one end with an annular flange 27. The annular flange 27 is placed in contact with screen 24 when screen 26 is positioned over the nipple 14. A resilient sealing ring 28 is positioned about nipple 14 and against flange 27. A central cyclindrical tube 30 is positioned about the nipple 14 and its upper end abuts a sealing ring 28. It will be noted from FIG. 2 that nipple 14 is not concentrically disposed in the tube 30 due to the offset of the inlet aperture 17.

An inner liner 32 which preferably consists of a No. 2 ½ size tin can fits within the exterior cylindrical housing 34, the dimensions of which are such that a No. 2 ½ tin can will fit snugly therein. When assembled, tube 30 and liner 32 define an annular chamber 29 which receives suitable filtering material therein. Between the bottom wall 33 of the liner 32 and the bottom wall 35 of the housing 34 there is an annular spacer 36 which supports the inner liner around its lower periphery upwardly away from the bottom wall 35 of the housing. Also note that the liner 32 is provided in a typical manner with flange 38 at the top and bottom thereof which operate to space the side wall of the liner 32 slightly away from the inner walls of housing 34.

The cylindrical tube 30 has its bottom end resting securely on bottom wall 33 of liner 32. Tube 30 is provided with a plurality of radially positioned apertures 31 through which incoming oil to the filter through oil pipe 11 flows into the chamber 29 where it will encounter filtering media 40. An annular disc 42 is positioned at the top of the inner liner 32 and is provided with a center aperture 44 so that it securely surrounds tube 30. The outside diameter of disc 42 is such that it will fit down snugly inside the top of liner 32 where it will rest upon the top of the filtering media 40. Between the top of the disc 42 and the large screen 24 there is positioned a sealing ring 46 which prevents leakage of oil from the housing after the exterior housing is threadedly attached to the cover plate 16 by threaded connecting means 17. Disc 42 is provided with a plurality of apertures 45 permitting oil to flow therethrough to apertures 18, thence to passage 12. The exterior of the bottom wall 35 is provided with an embossed hex nut 48 which permits one to tightly fasten the housing into the cover plate 16.

If a roll of conventional household toilet tissue is to be used as the filtering media 40, it is desirable to cut away a portion of the cardboard roll 50 at one end thereof to uncover the apertures 31, as shown in FIG. 2.

The manner of assembly of the filter housing to an engine block is relatively simple. After removing the original filter housing, cover plate 16 and screen 24 are first placed over oil pipe 11 whereby sealing ring 22 will bear upon the engine block to prevent any leakage at that point. Next, nipple 14 is screwed onto oil pipe 11 and securely tightened, thus holding the cover plate in place thereby coupling the inlet and outlet conduits of the engine to the inlet and outlet apertures of the filter housing. Then, inside the exterior housing 34 is placed first the lower spacer 36 and then the liner 32 with a roll of filtering media 40 placed therein. Tube 30 is inserted inside the roll 50 and then the disc 42 placed thereover pushing it firmly down below the top edge of liner 32. Then, screen 26 and sealing ring 28 are placed over the nipple 14, and with the sealing ring 46 in place within the cover plate 16, the exterior housing 34 is securely threaded into the cover plate 16 by means of the threaded connection 17 and can be tightened in that position by applying a wrench to the hex nut 48. When it is desired to change the filtering material 40, the housing is unfastened, disc 42 and tube 30 are removed and the inner liner 32 and the filter medium can all be disposed of and new ones substituted.

By thus providing the inner liner as a separate and additional part of the filter housing, it will be obvious that sludge collects in the bottom of the inner liner and is easily removed when the filter is changed by removing and discarding the liner and the filter without necessity for cleaning the liner or the outer housing which receives no such contamination. Additionally, the spacing of the bottom wall 33 away from the bottom wall 35 as well as the side walls of the liner 32 away from the housing permits them to flex somewhat when there are sudden changes in fluid pressure within the housing. Additionally, should the apertures 31 become clogged with excessive sludge, the flexing of the bottom wall 33 will permit oil to flow beneath the bottom edge of tube 30 where it will flow into the filtering material 40. It will be further noted that the disposition of the tissues in the filtering media 40, if toilet tissue or other similar substances are used, allows the oil to flow parallel to the tissues which is an easier path for the oil to follow rather than having to flow transversly through the filters as required in many prior art devices. It will also be apparent that the filter media to be used can be sold pre-packaged in a No. 2 ½ tin can as a replacement part for this product or the owner can supply his own materials.

While a particular embodiment of the present invention has been shown and described, it is not contemplated that this invention is limited to these particular details and that it will be obvious to persons skilled in the art that changes and modifications might be made without departing from this invention in its broader aspects for it is contemplated that this invention includes all such changes, modifications and equivalents.

I claim:

1. An oil filter housing assembly of a type capable of use with various types of filtering elements in conjunction with engines of the type having coaxially disposed engine oil conduits, the combination, comprising:

a circular cover plate, said cover plate having an inlet aperture and a plurality of outlet apertures, said outlet apertures being disposed in a concentric pattern about said inlet aperture, the center axis of said inlet aperture being offset from the center point of said cover plate, means for attaching said cover plate directly to an engine block, said attaching means comprising threaded connecting means engaging an oil conduit of said engine to couple said conduit to an aperture of said cover plate, said attaching means thereby further placing the other oil conduits of said engine in fluid flow relationship with the other apertures of said cover plate;

an exterior cylindrical housing with a bottom wall, means for threadably attaching said housing to said cover plate, an inner cylindrical liner with a bottom wall, said lines removably situated in close fitting relationship inside said exterior housing, a tube concentrically located within said liner and extending substantially from said cover plate to the bottom wall of said liner, said tube having a top end adjacent said cover plate and a bottom end contacting said bottom wall said tube being of substantially lesser diameter than said liner defining an annular chamber within said liner, the top end of said tube surrounding said inlet aperture in fluid sealing relation, said tube having a plurality of apertures in the side walls thereof at a spaced interval from the bottom end thereof, said apertures communicating the interior of said tube with said annular chamber.

2. The assembly set forth in claim 1, further including spacer means positioned between the inside of the bottom wall of said exterior housing and the bottom wall of said liner whereby said bottom walls are maintained in spaced-apart relationship.

3. The assembly set forth in claim 1, further including a disc member positioned within a top edge of said liner, said disc having a central aperture receiving said tube therethrough, said disc having a plurality of additional apertures spaced about said central aperture.

4. The assembly set forth in claim 1 further including a screen member of disc-like configuration positioned within an underside of said cover plate, said screen member having a dimension substantially coterminous with the interior dimension of said cover plate, said screen member having a nonconcentric aperture therein aligned with the inlet aperture of said cover plate.

5. The assembly set forth in claim 1, further including a screen member having a substantially conical configuration, said screen member having an annular flange at one end thereof, said cover plate attaching means comprising a nut for threaded engagement with an oil inlet line, said conical screen member fitting over said nut with the flange thereof adjacent an underside of said cover plate, an annular sealing member surrounding said screen member adjacent said flange, the upper end of said tube abutting said sealing member.

6. The assembly set forth in claim 1, further including:
a first screen member of disc-like configuration positioned within an underside of said cover plate, said first screen member having a dimension great enough to cover the outlet apertures of said cover plate, said first screen member having an aperture therein aligned with the inlet aperture of said cover plate;
a second screen member having a substantially conical configuration, said second screen member having an annular flange at one end thereof, said second screen member having the flanged end thereof aligned with the inlet aperture of said cover plate and adjacent the underside thereof, an annular sealing member surrounding said second screen member adjacent said flange, the top end of said tube sealingly abutting said sealing member.

7. The assembly set forth in claim 3, further including:
a first screen member of disc-like configuration positioned within an underside of said cover plate, said first screen member having a dimension great enough to cover the outlet apertures of said cover plate, said first screen member having an aperture therein aligned with the inlet aperture of said cover plate;
a second screen member having a substantially conical configuration, said second screen member having an annular flange at one end thereof, said second screen member having the flanged end thereof aligned with the inlet aperture of said cover plate and adjacent the underside thereof, an annular sealing member surrounding said second screen member adjacent said flange, the top end of said tube sealingly abutting said sealing member.

8. The assembly set forth in claim 1 further including a roll of tissue paper disposed within said annular chamber, said roll of tissue paper having a central roll of cardboard, said tube extending through said cardboard roll, said cardboard roll extending less than the length of said roll of tissue terminating near the bottom end thereof at a point above the location of the apertures in the side wall of said tube.

9. The assembly set forth in claim 7 further including a roll of tissue paper disposed within said annular chamber, said roll of tissue paper having a central roll of cardboard, said tube extending through said cardboard roll, said cardboard roll extending less than the length of said roll of tissue terminating near the bottom end thereof at a point above the location of the apertures in the side wall of said tube.

10. An oil filter housing assembly of a type capable of use with various types of filtering elements in conjunction with engines of the type having coaxially disposed engine oil conduits, the combination, comprising:
an exterior cylindrical housing, an inner cylindrical liner disposed within said housing, said inner liner having a bottom wall, a circular cover plate having means for threadably attaching said housing to said plate, said cover plate having inlet and outlet apertures therein, said apertures being located off center with respect to the center point of said plate, a central cylindrical tube of substantially smaller diameter than the diameter of said housing, said tube being disposed concentrically within said housing and extending substantially from said cover plate to the bottom wall of said inner liner, said tube and said liner defining an annular chamber within said housing, and means for attaching said cover plate directly to an engine block in communication with the oil conducting system thereof, said cover plate attaching means comprising threaded connector means engaging an oil conduit of said engine to couple said conduit to an aperture of said cover plate, said attaching means thereby further placing the other conduits of said engine in fluid flow relationship with the other apertures of said cover plate.

* * * * *